(12) United States Patent
Kim et al.

(10) Patent No.: US 9,286,694 B2
(45) Date of Patent: Mar. 15, 2016

(54) APPARATUS AND METHOD FOR DETECTING MULTIPLE ARMS AND HANDS BY USING THREE-DIMENSIONAL IMAGE

(71) Applicant: Electronics and Telecommunications Research Institute, Daejeon (KR)

(72) Inventors: Dae Hwan Kim, Sejong-si (KR); Jin Ho Kim, Daejeon (KR); Dong Sik Jo, Daejeon (KR); Hang Kee Kim, Daejeon (KR); Hye Mi Kim, Daejeon (KR); Ki Hong Kim, Daejeon (KR)

(73) Assignee: ELECTRONICS AND TELECOMMUNICATIONS RESEARCH INSTITUTE, Deajeon (KR)

( * ) Notice: Subject to any disclaimer, the term of this patent is extended or adjusted under 35 U.S.C. 154(b) by 0 days.

(21) Appl. No.: 14/338,933

(22) Filed: Jul. 23, 2014

(65) Prior Publication Data

US 2015/0199824 A1 Jul. 16, 2015

(30) Foreign Application Priority Data

Jan. 10, 2014 (KR) ........................ 10-2014-0003290

(51) Int. Cl.
*G06K 7/10* (2006.01)
*G06T 7/20* (2006.01)
*G06T 7/00* (2006.01)

(52) U.S. Cl.
CPC ............... *G06T 7/2033* (2013.01); *G06T 7/004* (2013.01); *G06T 2200/04* (2013.01); *G06T 2207/30196* (2013.01); *G06T 2215/16* (2013.01)

(58) Field of Classification Search
USPC ............... 235/462.27, 454; 345/156, 158; 715/863
See application file for complete search history.

(56) References Cited

U.S. PATENT DOCUMENTS

| | | | |
|---|---|---|---|
| 6,545,663 B1 * | 4/2003 | Arbter et al. | 345/158 |
| 2012/0163661 A1 | 6/2012 | Lee et al. | |
| 2013/0158946 A1 * | 6/2013 | Scherberger et al. | 702/151 |
| 2013/0177204 A1 | 7/2013 | Yun et al. | |
| 2014/0055352 A1 * | 2/2014 | Davis et al. | 345/156 |
| 2014/0118563 A1 * | 5/2014 | Mehta et al. | 348/207.1 |
| 2015/0035750 A1 * | 2/2015 | Bailey et al. | 345/158 |

FOREIGN PATENT DOCUMENTS

KR 10-2013-0082216 A 7/2013

OTHER PUBLICATIONS

Cheng Li et al., "Pixel-level Hand Dectection in Ego-Centric Videos", CVPR2013 Paper, 2013, pp. 3570-3577, Computer Vision Foundation.

* cited by examiner

*Primary Examiner* — Ahshik Kim

(57) ABSTRACT

Provided are an apparatus and method for detecting a plurality of arms and hands by using a three-dimensional (3D) image. The apparatus includes an image input unit configured to acquire a 3D image of an object, an arm detecting unit configured to detect one or more component-unit candidate regions of the object in the 3D image, and detect one or more arm regions by using arm detection feature information, extracted from each of the candidate regions, and a pattern recognition algorithm, and a hand detecting unit configured to calculate a position of a hand and a position of a wrist in each of the arm regions detected by the arm detecting unit, and detect a hand region by using the position of the hand and the position of the wrist.

16 Claims, 8 Drawing Sheets

APPARATUS AND METHOD FOR DETECTING MULTIPLE ARMS AND HANDS BY USING THREE-DIMENSIONAL IMAGE

CROSS-REFERENCE TO RELATED APPLICATIONS

This application claims priority under 35 U.S.C. §119 to Korean Patent Application No. 10-2014-0003290, filed on Jan. 10, 2014, the disclosure of which is incorporated herein by reference in its entirety.

TECHNICAL FIELD

The present invention relates to a technology for detecting and tracking an object, and more particularly, to an apparatus and method for detecting and tracking a plurality of arms and hands in a three-dimensional (3D) image.

BACKGROUND

An intuitive interaction method easy to understand is being recently used in combination with an augmented reality (AR), a virtual reality, and gesture recognition, in various application fields such as game machines, televisions (TVs), mobile terminals, wearable computers, etc. However, since most of methods use a physical touch panel or a physical user interface (PUI) at present, a user should actually touch a button, or touch or hold specific equipment. To overcome such a limitation, much research interests in a method in which a product interacts with a hand in a space. In particular, wearable equipment that enables the free use of both hands as in Google Glass requires an interaction method using an arm/hand.

SUMMARY

Accordingly, the present invention provides an apparatus and method which accurately detect and track a plurality of users' arms and hands in a 3D image.

The object of the present invention is not limited to the aforesaid, but other objects not described herein will be clearly understood by those skilled in the art from descriptions below.

In one general aspect, an apparatus for detecting a plurality of arms and hands by using a three-dimensional (3D) image includes: an image input unit configured to acquire a 3D image of an object; an arm detecting unit configured to detect one or more component-unit candidate regions of the object in the 3D image, and detect one or more arm regions by using arm detection feature information, extracted from each of the candidate regions, and a pattern recognition algorithm; and a hand detecting unit configured to calculate a position of a hand and a position of a wrist in each of the arm regions detected by the arm detecting unit, and detect a hand region by using the position of the hand and the position of the wrist.

By using a cascade technique, the arm detecting unit may sequentially exclude candidate regions, from which feature information having a low correlation with feature information of an arm are extracted, among the detected candidate regions.

The arm detecting unit may include: an object detector configured to detect the one or more component-unit candidate regions of the object in the 3D image; an arm feature extractor configured to extract the arm detection feature information from each of the candidate regions; and an arm object determiner configured to, by using a cascade technique, sequentially exclude candidate regions, from which feature information having a low correlation with feature information of an arm are extracted, among the detected candidate regions to determine an arm candidate region.

The feature information may include at least one of a texture, a color, a shape, a length, a contour line, and a parallel line.

The hand detecting unit may determine the hand region by using a classifier that has been learned by using the position of the hand and the position of the wrist as feature information.

The hand detecting unit may detect a hand candidate region from each arm region, sets a region having a predetermined volume of a hand in a 3D pixel connection path direction with respect to an uppermost pixel in a long axis direction of an arm in the hand candidate region, and determine, as the position of the hand, an average position coordinate value of pixels included in the set region.

The hand detecting unit may set a polar coordinate system with the position of the hand as an origin, perform an angle-based log search, and search for a wrist region while sequentially moving between paths.

The hand detecting unit may determine, as the position of the wrist, a point for which an inflection point is generated on a moving path, in which there is a parallel line with respect to the moving path, among a plurality of paths with the position of the hand as an origin in a 3D pixel direction.

In another general aspect, an apparatus for detecting a plurality of arms and hands by using a three-dimensional (3D) image includes: an image input unit configured to acquire a real-time 3D image of an object; an arm detecting unit configured to detect one or more component-unit candidate regions of the object in a current 3D image frame, and detect one or more arm regions by using arm detection feature information, extracted from each of the candidate regions, and a pattern recognition algorithm; and an arm tracking unit configured to track an arm by using an association between a first arm track feature of each of one or more arm regions detected from the current 3D image frame and a second arm track feature of each of one or more arm regions detected from a previous 3D image frame.

By using a cascade technique, the arm detecting unit may sequentially excludes candidate regions, from which feature information having a low correlation with feature information of an arm are extracted, among the detected candidate regions.

The arm tracking unit may evaluate a similarity between the first arm track feature of each of the one or more arm regions detected from the current 3D image frame and the second arm track feature of each of the one or more arm regions detected from the previous 3D image frame to track an arm.

The apparatus may further include: a hand detecting unit configured to calculate a position of a hand and a position of a wrist in each arm region tracked by the arm tracking unit, and detect a hand region by using the position of the hand and the position of the wrist; and a hand tracking unit configured to track a hand by using an association between a first hand track feature of each of one or more hand regions detected from the current 3D image frame and a second hand track feature of each of one or more hand regions detected from the previous 3D image frame.

The hand detecting unit may determine the hand region by using a classifier that has been learned by using the position of the hand and the position of the wrist as feature information.

The hand detecting unit may detect a hand candidate region from each arm region, set a region having a predetermined volume of a hand in a 3D pixel connection path direction with respect to an uppermost pixel in a long axis direction of an arm in the hand candidate region, and determine, as the position of the hand, an average position coordinate value of pixels included in the set region.

The hand detecting unit may set a polar coordinate system with the position of the hand as an origin, perform an angle-based log search, and search for a wrist region while sequentially moving between paths.

The apparatus may further include a hand/arm information storage unit configured to store the first and second arm track features and the first and second hand track features.

In another general aspect, a method of detecting a plurality of arms and hands by using a three-dimensional (3D) image includes: acquiring a real-time 3D image of an object; detecting one or more component-unit candidate regions of the object in a current 3D image frame, and detecting one or more arm regions by using arm detection feature information, extracted from each of the candidate regions, and a pattern recognition algorithm; tracking an arm by using an association between a first arm track feature of each of one or more arm regions detected from the current 3D image frame and a second arm track feature of each of one or more arm regions detected from a previous 3D image frame; calculating a position of a hand and a position of a wrist in each tracked arm region, and detecting a hand region by using the position of the hand and the position of the wrist; tracking a hand by using an association between a first hand track feature of each of one or more hand regions detected from the current 3D image frame and a second hand track feature of each of one or more hand regions detected from the previous 3D image frame; and updating a database with the first arm hand track feature and the first hand track feature.

Other features and aspects will be apparent from the following detailed description, the drawings, and the claims.

DETAILED DESCRIPTION OF EMBODIMENTS

Figure 1:
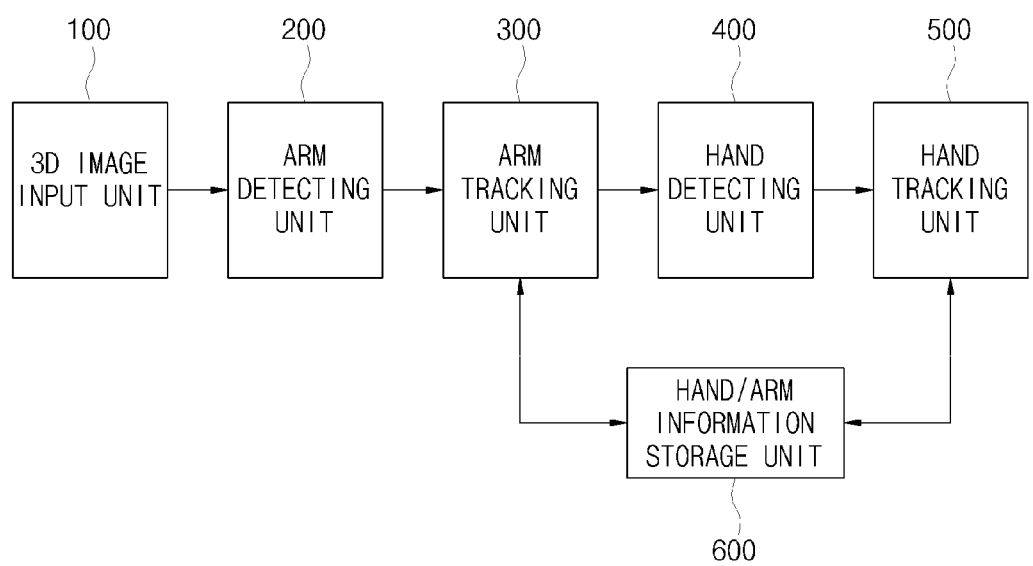
FIG. 1 is a diagram illustrating an internal configuration of an apparatus for detecting a plurality of arms and hands by using a 3D image, according to an embodiment of the present invention.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. In the following description, the technical terms are used only for explaining a specific exemplary embodiment while not limiting the present invention. The terms of a singular form may include plural forms unless specifically mentioned.

Hereinafter, exemplary embodiments of the present invention will be described in detail with reference to the accompanying drawings. In adding reference numerals for elements in each figure, it should be noted that like reference numerals already used to denote like elements in other figures are used for elements wherever possible. Moreover, detailed descriptions related to well-known functions or configurations will be ruled out in order not to unnecessarily obscure subject matters of the present invention.

FIG. 1 is a diagram illustrating an internal configuration of an apparatus for detecting a plurality of arms and hands by using a 3D image, according to an embodiment of the present invention.

Referring to FIG. 1, the apparatus for detecting a plurality of arms and hands by using a 3D image according to an embodiment of the present invention includes a 3D image input unit 100, an arm detecting unit 200, an arm tracking unit 300, a hand detecting unit 400, a hand tracking unit 500, and a hand/arm information storage unit 600.

The 3D image input unit 100 acquires a 3D image of an observation target (or an object). The 3D image input unit 100 acquires, in real time, the 3D image of the observation target from a means that acquires a two-dimensional (2D) image, a means that acquires a 3D depth image for supporting various 3D image shapes, a means that acquires multi-view 2D images, and a means that acquires a stereo image.

For example, when a manual sensor is used, the 3D image input unit 100 uses two sensors (a CCD, and an IR) having the same type by using a stereo structure. When an active sensor is used, the 3D image input unit 100 generates a 3D image including distance information by using Kinect or a time of flight (TOI).

In a case of an input image of the means that acquires a 2D image, the 3D image input unit 100 performs a process that generates a 3D image from 2D images. Also, since a 3D depth image or the 3D image generated from the 2D images includes fundamental noise, image correction is performed by various image correction methods.

The 3D depth image is an image in which depth information, instead of color information or contrast information, is given to each pixel unit of a 2D image input from a camera. The depth image may be obtained by two methods. One of the two methods is a method which uses the principle that senses a distance of an observation space and a 3D shape of an object by using images input from a pair of cameras as if a human recognizes a stereoscopic space through stereo matching by using a visual cortex in two eyes and a brain. However, such a method is not suitable to obtain accurate depth information in real time because having a number of operations, and when an operation speed increases for real-time processing, an accuracy of the depth information is reduced.

The other method for obtaining a depth image is a method that irradiates a laser to the front of a camera, and calculates a laser-reflected speed to obtain depth information. Such a method is used in real time, and has a high degree of accuracy.

The arm detecting unit 200 determines a plurality of hand candidate regions in a 3D image transferred from the 3D image input unit 100, based on pattern recognition, and segments only a hand region from the hand candidate regions by using various segmentation techniques.

Figure 2:
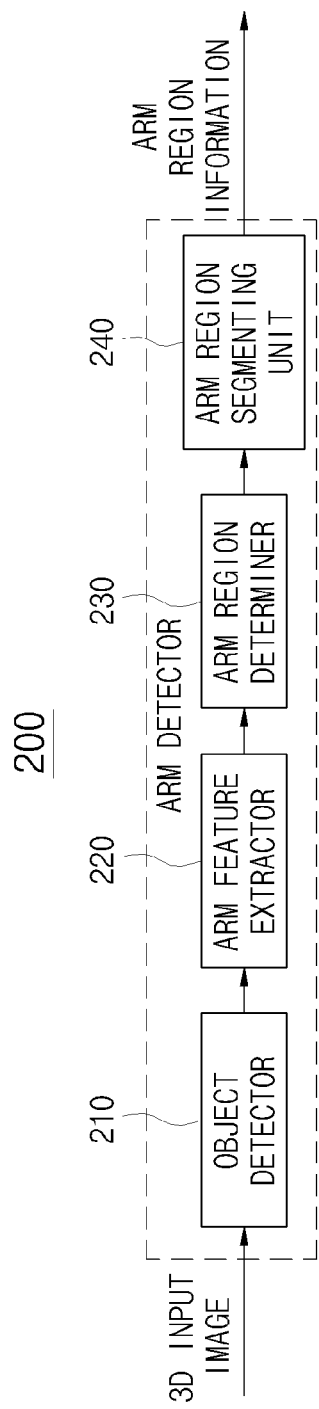
FIG. 2 is a diagram illustrating an internal configuration of an arm detecting unit of FIG. 1.

Hereinafter, an internal configuration of the arm detecting unit 200 according to an embodiment of the present invention will be described in detail with reference to FIG. 2. FIG. 2 is a diagram illustrating an internal configuration of the arm detecting unit 200 of FIG. 1.

Referring to FIG. 2, the arm detecting unit 200 according to an embodiment of the present invention includes an object detector 210, an arm feature extractor 220, an arm object determiner 230, and an arm region segmenting unit 240.

The object detector 210 detects an object from a 3D image. For example, the object detector 210 detects various kinds of objects, which is capable of composing one component, from a 3D image.

For example, much time is expended when searching for a pattern equal or similar to that of an arm region in all portions of an input 3D image, and an accuracy of detection is reduced. According to an embodiment of the present invention, various kinds of objects capable of composing one component are detected from a 3D image, and an operation of determining an arm region is performed for only the detected objects by using a pattern recognition algorithm, thereby shortening a detection time and increasing an accuracy of detection.

The arm feature extractor 220 extracts various kinds of features, which is usable for pattern recognition, from an object region.

For example, the arm feature extractor 220 extracts features, such as a texture, a color, a shape, a length, a contour line, and a parallel line, from an image of the detected object region.

The arm object determiner 230 determines a hand candidate region in the detected objects by suing the extracted various features. In this case, the arm object determiner 230 uses a method that removes objects, having a feature which differs from that of an arm, by using a cascade technique.

The arm object determiner 230 determines an arm candidate region in the detected objects by using various pattern recognition methods other than the cascade technique. For example, the arm object determiner 230 removes objects, having a feature which differs from that of an arm, by using a cascade technique, and then compares features (which are extracted from the remaining objects) and features of an arm feature information database stored in the hand/arm information storage unit 600 to determine, as an arm candidate region, an object in which similarity is equal to or greater than a predetermined threshold value. In this case, a plurality of objects may be determined as arm candidate regions.

The arm region segmenting unit 240 accurately segments only an arm region from the objects, which determined as the arm candidate regions, by using various segmentation techniques. An image division or segmentation technique may use various know technologies, and detailed descriptions related thereto will be ruled out in order not to unnecessarily obscure subject matters of the present invention.

Returning to FIG. 1, the arm tracking unit 300 will be described in detail.

The arm tracking unit 300 tracks a plurality of arms in a 3D image, which is input in real time, under a covered environment.

For example, the arm tracking unit 300 performs an association-based tracking process for a plurality of arm candidate regions detected from a previous image frame, by using an arm detection feature extracted by the arm feature extractor 220 and arm track features which are newly extracted for tracking a plurality of arms, thereby ensuring a good track performance even under an environment in which a portion of an arm is covered by another object.

Figure 3:
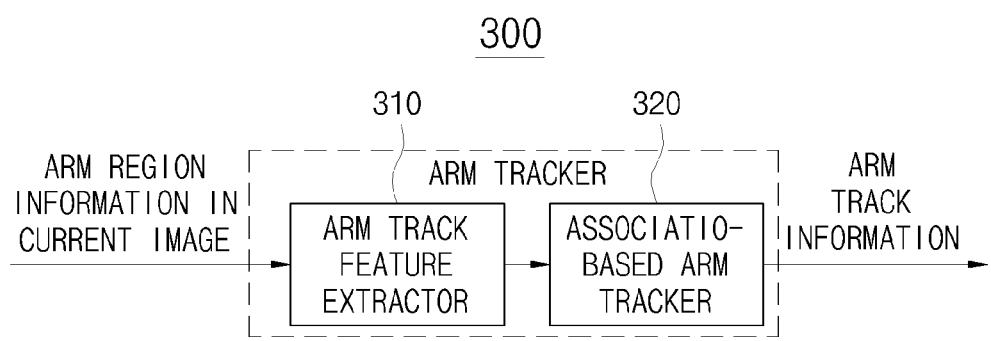
FIG. 3 is a diagram illustrating an internal configuration of an arm tracking unit of FIG. 1.

Hereinafter, an internal configuration of the arm tracking unit 300 according to an embodiment of the present invention will be described in detail with reference to FIG. 3. FIG. 3 is a diagram illustrating an internal configuration of the arm tracking unit 300 of FIG. 1.

Referring to FIG. 3, the arm tracking unit 300 according to an embodiment of the present invention includes an arm track feature extractor 310 and an association-based arm tracker 320.

The arm track feature extractor 310 compares arm regions, detected from a previous image frame and a current image frame, and arm track features (features such as a position, a speed, an acceleration, and a motion) necessary for tracking an arm, in addition to the arm detection features (the texture, the color, the shape, the length, the contour line, and the parallel line) extracted by the arm feature extractor 220, thereby extracting a desired feature.

The association-based arm tracker 320 tracks arm regions by using an association between arm track features of the previous image frame and arm tack features of the current image frame.

For example, an operation of tracking arm regions may be performed by comparing and analyzing similarities between the arm track features of the previous image frame and the arm tack features of the current image frame. An arm having the highest similarity is high in accuracy of track.

The association-based tracking process is a method that compares and tracks detected features, and thus can track a covered arm(s) well. Therefore, the association-based tracking process can accurately track an arm(s) even under an environment, which is covered by a thing instead of an arm, and an environment in which arms of several persons are not distinguished. Since information of a finally tracked arm(s) should be used for tracking in a next image frame, a position and feature information of the tracked arm(s) is stored in the arm/hand information storage unit 600, and is used to track an arm(s) in the next image frame.

Returning again to FIG. 1, the hand detecting unit 400 will be described in detail.

The hand detecting unit 400 detects a plurality of hand regions from a plurality of tracked arm regions of a current image frame by using a machine learning method or a pattern recognition method.

Figure 4:
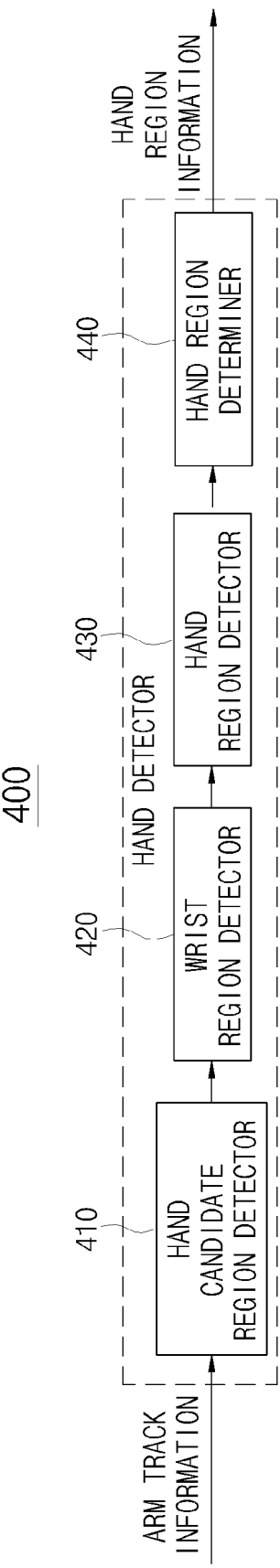
FIG. 4 is a diagram illustrating an internal configuration of a hand detecting unit of FIG. 1.

Hereinafter, an internal configuration of the hand detecting unit 400 according to an embodiment of the present invention will be described in detail with reference to FIG. 4. FIG. 4 is a diagram illustrating an internal configuration of the hand detecting unit 400 of FIG. 1.

Referring to FIG. 4, the hand detecting unit 400 according to an embodiment of the present invention includes a hand candidate region detector 410, a wrist region detector 420, a hand region determiner 430, and a hand region segmenting unit 440.

The hand candidate region detector 410 detects a position of a hand candidate region, having a shape and a volume which are similar to those of a hand, from the tracked arm regions of the current image frame by using a classifier that has been learned by the machine learning method or the pattern recognition method. Here, the classifier may be learned by using features such as a texture, a color, a shape, a length, a volume, and a depth difference.

A hand is approximately cylindrical in shape. In regard to volume and depth information, the hand has a difference with the other objects. In an embodiment of the present invention, the classifier is learned based on a lot of features including the volume and depth information by using an adaptive boosting (AdaBoost) algorithm. The learned classifier detects a hand candidate region at a position having a shape similar to the learned shape.

Figure 8:
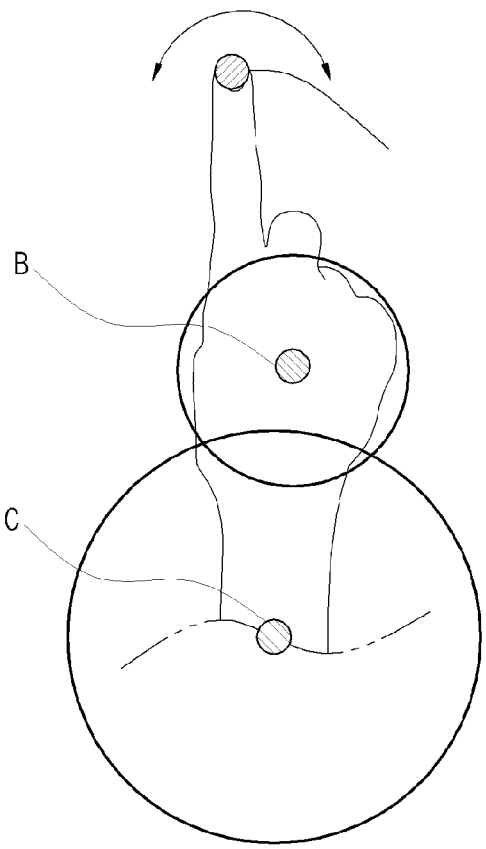
FIG. 8 is a diagram illustrating a result which is obtained by extracting positions of a hand and a wrist from a detected hand candidate region.

FIG. 8 is a diagram illustrating a result which is obtained by extracting positions of a hand and a wrist from a detected hand candidate region.

In FIG. 8, a "B" dot indicates a position of a hand, and a "C" dot indicates a position of a wrist. Here, the position of the hand and the position of the wrist are illustrated as coordinate values on 2D or 3D coordinates, and may be construed as denoting representative values of the positions of the hand and the wrist.

In the present specification, it is described that the position of the hand is calculated by the hand candidate region detector 410, and the position of the hand is calculated by the wrist region detector 420, but a main element of each extraction process is not limited to an element described herein. For convenience of description, it is assumed that the position of the hand is calculated by the hand candidate region detector 410, and the position of the hand is calculated by the wrist region detector 420.

As illustrated in FIG. 8, the hand candidate region detector 410 detects a hand candidate region from the tracked plurality of arm regions. In FIG. 8, a region except a background denotes a hand candidate region.

A region (a circle which have "B" dot as a center) having an approximate volume (for example, 10 cm×10 cm×10 cm) of a hand is set in an end point of a detected hand candidate region, namely, in a 3D pixel connection path direction (i.e., in a long axis direction of the end point) with respect to an uppermost pixel in a long axis direction of an arm in the detected hand candidate region, and a position of the hand is determined as average 2D or 3D position coordinates of pixels included in the set region.

The wrist region detector 420 detects a wrist region from the detected hand candidate region, for enhancing an accuracy of hand region detection.

To provide a detailed description, the wrist region detector 420 detects the wrist region while moving in the 3D pixel connection path direction with respect to the position (a "B" dot, see FIG. 8) of the hand determined by the hand candidate region detector 410.

In this case, instead of one moving path, a plurality of moving paths are formed. Since there are too many paths, it is required to exclude paths, having a low possibility that is connected to the wrist region, from among the formed plurality of paths.

To this end, the wrist region detector 420 sets a polar coordinate system with the position of the hand ("B" dot) as the origin, performs an angle-based log search, and searches for the wrist region while sequentially moving between the paths. Through such an operation, the number of all possible paths is rapidly reduced by removing similar paths.

Figure 9:
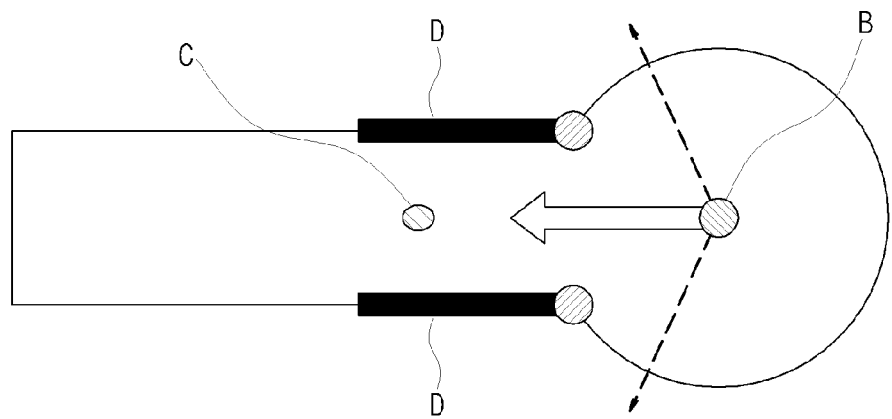
FIG. 9 is a diagram illustrating a detailed example in which a wrist region is detected by searching for a path connected to the wrist region among a plurality of paths.
Figure 10:
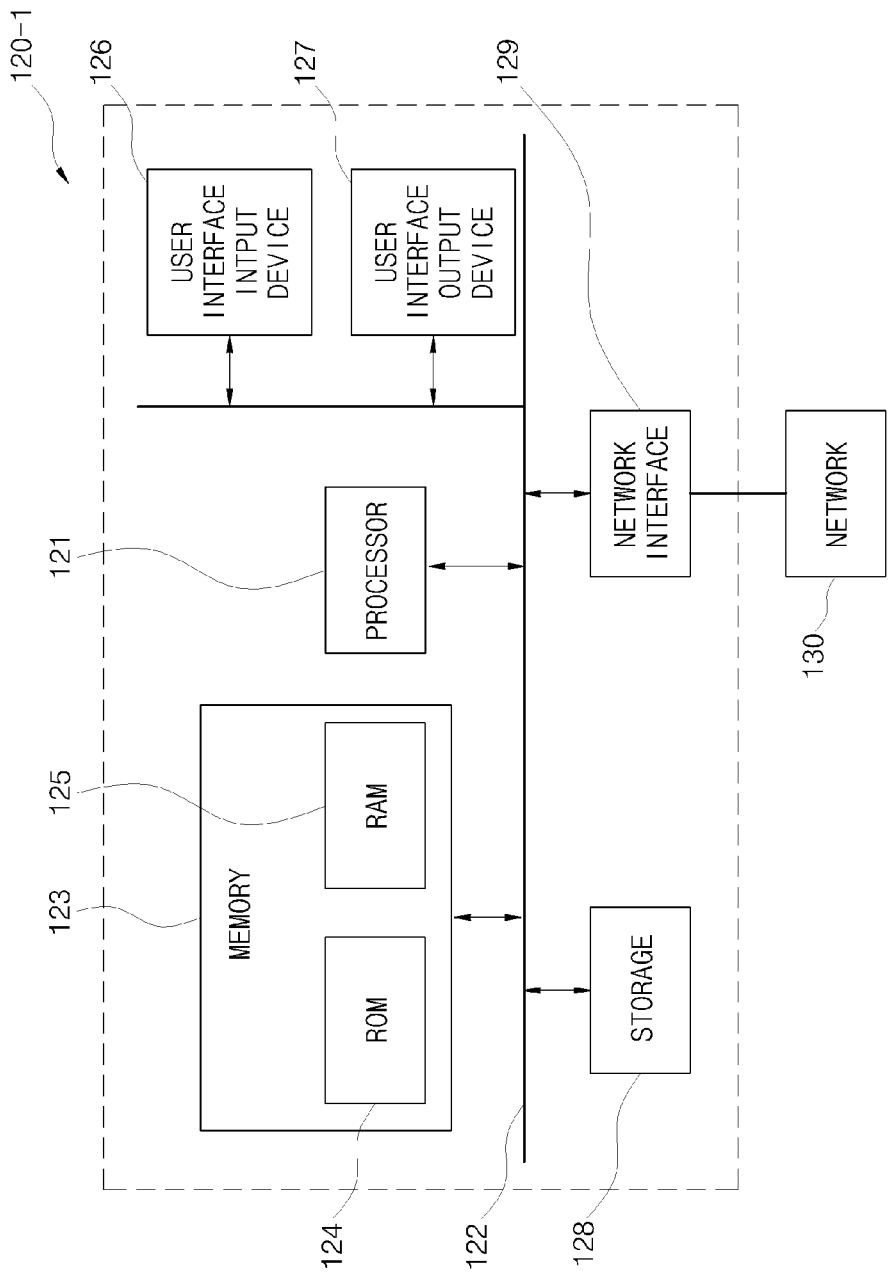
FIG. 10 is a diagram illustrating a configuration of a computer device in which a method for detecting a plurality of arms and hands by using a 3D image, according to an embodiment of the present invention is executed.

FIG. 9 illustrates a detailed example in which a wrist region is detected by searching for a path connected to the wrist region among a plurality of paths.

For example, among several paths (which start with a position of a hand ("B" dot) as the origin) in a 3D pixel direction, there is a point at which an inflection point is generated, and there is a point for which the inflection point is not generated. Similarly, a parallel line may exist or not with respect to a moving path.

A position of a wrist is on a moving path in which there are parallel lines ("D" lines, see FIG. 9) with respect to the moving path, among the several paths (which start with the position of the hand as the origin) in the 3D pixel direction, and is detected at a point (a "C" dot, see FIG. 9) for which the inflection point is generated on the moving path.

The hand region determiner 430 determines a hand region by using a calculated position of a hand, a calculated position of a wrist, and the classifier that has been learned by the machine learning method or the pattern recognition method. A learning algorithm for determining a hand region may be variously used.

The hand region segmenting unit 440 accurately segments only the hand region from objects, which determined as the hand candidate regions, by using various segmentation techniques. An image division or segmentation technique may use various know technologies, and detailed descriptions related thereto will be ruled out in order not to unnecessarily obscure subject matters of the present invention.

Returning again to FIG. 1, the hand tracking unit 500 will be described in detail.

The hand tracking unit 500 tracks a plurality of hands in a 3D image, which is continuously input in real time, even under a covered environment.

For example, the hand tracking unit 500 performs an association-based tracking process for a plurality of hand candidate regions detected from a previous image frame, by using a hand detection feature extracted for hand detection and hand track features which are newly extracted for tracking a plurality of arms, thereby ensuring a good track performance even under an environment in which a portion of a hand is covered by another object.

Figure 5:
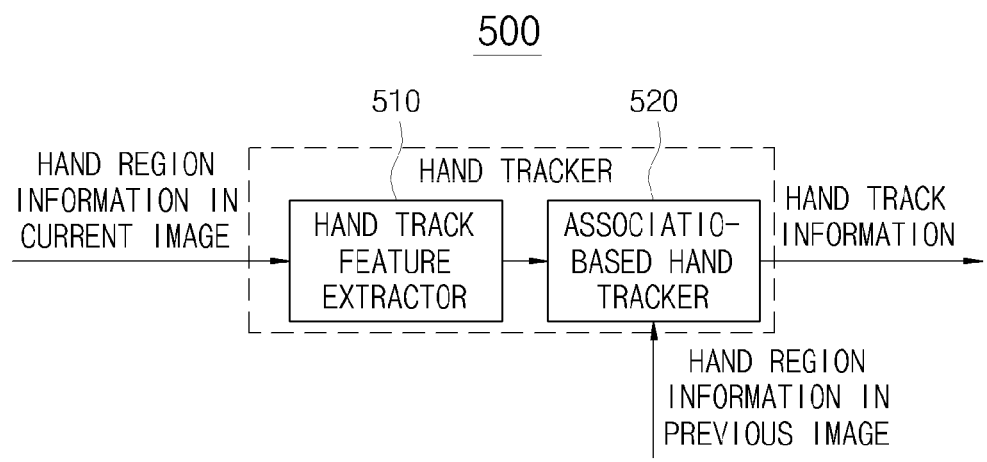
FIG. 5 is a diagram illustrating an internal configuration of a hand tracking unit of FIG. 1.

Hereinafter, an internal configuration of the hand tracking unit 500 according to an embodiment of the present invention will be described in detail with reference to FIG. 5. FIG. 5 is a diagram illustrating an internal configuration of the arm tracking unit 500 of FIG. 1.

Referring to FIG. 5, the hand tracking unit 500 according to an embodiment of the present invention includes a hand track feature extractor 510 and an association-based hand tracker 520.

The hand track feature extractor 510 compares hand regions, detected from a previous image frame and a current image frame, and hand track features (features such as a position, a speed, an acceleration, and a motion) necessary for tracking a hand, thereby extracting a desired feature.

The association-based hand tracker 520 tracks hand regions by using an association between hand track features of the previous image frame and hand tack features of the current image frame.

For example, an operation of tracking hand regions may be performed by comparing and analyzing similarities between the hand track features of the previous image frame and the hand tack features of the current image frame. A hand having the highest similarity is high in accuracy of track.

The association-based tracking process is a method that compares and tracks detected features, and thus can track a covered hand(s) well. Therefore, the association-based tracking process can accurately track a hand(s) even under an environment, which is covered by a thing instead of a hand, and an environment in which hands of several persons are not distinguished. Since information of a finally tracked hand(s) should be used for tracking in a next image frame, a position and feature information of the tracked hand(s) is stored in the arm/hand information storage unit 600, and is used to track a hand(s) in the next image frame.

Figure 6:
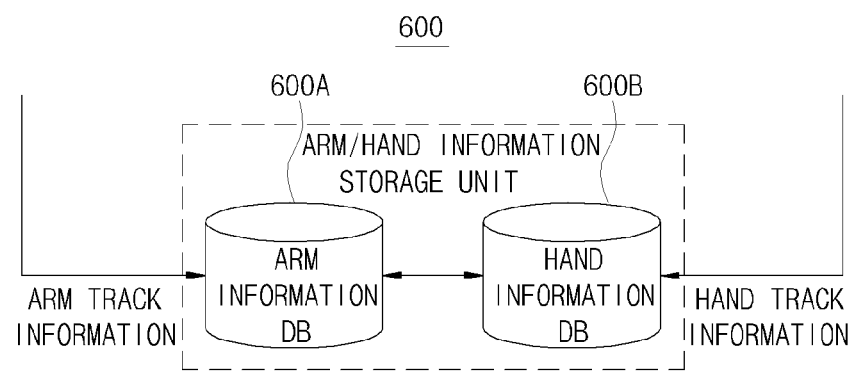
FIG. 6 is a diagram illustrating an internal configuration of a hand/arm information storage unit of FIG. 1.

FIG. 6 is a diagram illustrating an internal configuration of the hand/arm information storage unit 600 of FIG. 1.

Referring to FIG. 6, the hand/arm information storage unit 600 includes an arm information database (DB) 600a and a hand information database 600b.

The reason that stores hand/arm information is for tracking arm/hand(s) which is (are) shown in a next image frame. Arm/hand obtained by tracking an arm/hand is stored or read. The arm information database (DB) 600a and the hand information database 600b have an including relationship, and thus, pieces of information of an arm and hand having the same identification (ID) may be mapped to each other, and features of the arm and hand may be shared. Information stored in the hand/arm information storage unit 600 includes a position, a speed, an acceleration, a motion, a texture, a color, a shape, a length, a volume, a depth difference, an contour line, and a parallel line. The information may be used to track an arm/hand in each image frame, and may be updated by the arm tracking unit 300 and the hand tracking unit 500. The hand/arm information storage unit 600 may fundamentally store past history information, which may be used in an association-based tracking method.

Figure 7:
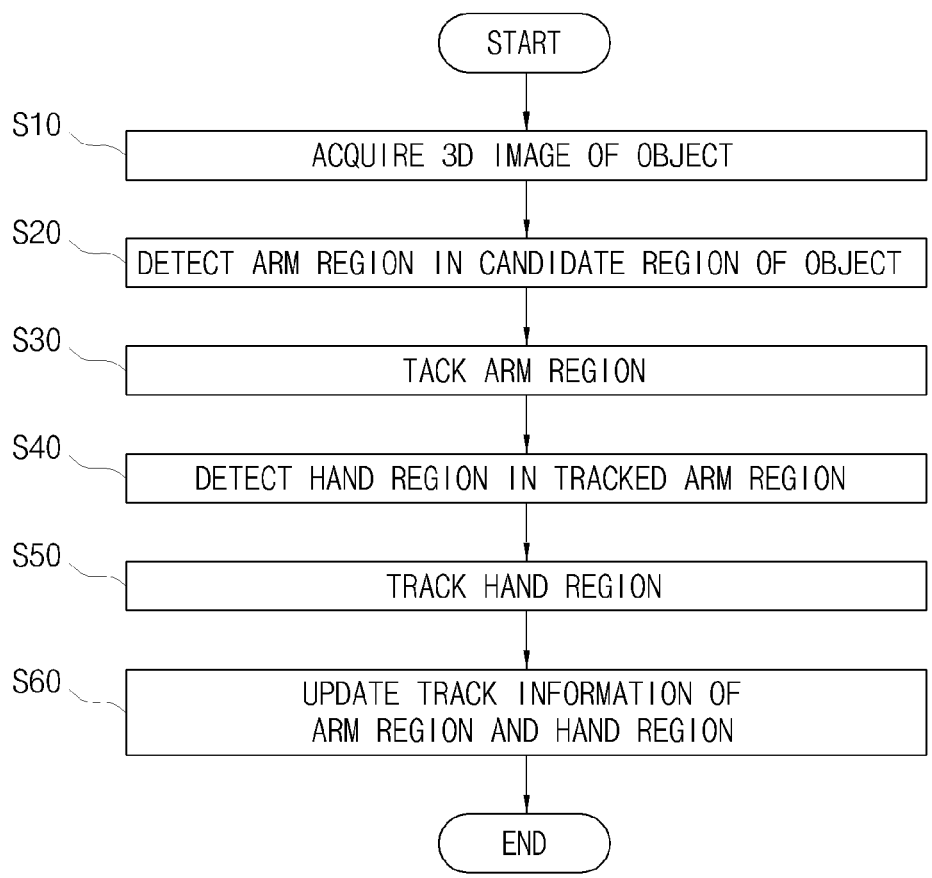
FIG. 7 is a diagram illustrating a method for detecting a plurality of arms and hands by using a 3D image, according to another embodiment of the present invention.

Hereinabove, the configuration and function of the apparatus of apparatus for detecting a plurality of arms and hands by using a 3D image according to an embodiment of the present invention have been described. Hereinafter, an operation of the above-described arm and hand detecting apparatus will be described in detail with reference to FIG. 7.

In operation S10, the 3D image input unit 100 acquires a real-time 3D image of an object. In this case, the 3D image input unit 100 may receive a 3D image, or receive multi-view 2D images obtained by photographing the same object. When an input image is the multi-view 2D images, a process of generating a 3D image by using the multi-view 2D images may be performed. However, since an input 3D image or the generated 3D image includes fundamental noise, an image from which noise has been removed by various image correction methods is output.

In operation S20, the arm detecting unit 200 detects one or more component-unit candidate regions of an object in a currently input 3D image frame, and detects one or more arm regions by using arm detection feature information (extracted from each of the candidate regions) and the pattern recognition algorithm.

In order to detect an arm region from the detected candidate region, it is required to extract features that enable a pattern such as an arm to be recognized. Therefore, the arm detecting unit 200 extracts features, such as a texture, a color, a shape, a length, a contour line, and a parallel line, from a candidate region image. Subsequently, the arm detecting unit 200 determines an arm region in the detected candidate regions by using the extracted features. In this case, the cascade technique, which sequentially excludes candidate regions from which feature information having a low correlation with feature information of an arm are extracted among the detected candidate regions, may be used.

In operation S30, the arm tracking unit 300 tracks an arm by using an association between a first arm track feature of each of one or more arm regions detected from a current 3D image frame and a second arm track feature of each of one or more arm regions detected from a previous 3D image frame.

To track an arm, arm track features necessary for tracking an arm should be extracted. In addition to arm detection features (a texture, a color, a shape, a length, a contour line, and a parallel line), features such as a position, a speed, an acceleration, and a motion are extracted, and used as arm track features.

For example, the arm tracking unit 300 tracks an arm(s) by using an association between an arm(s) having the extracted track features and an arm(s) which is being tracked in a previous image frame. Here, the feature information of the arm(s) of the previous image frame is read from the hand/arm information storage unit 600.

An association method compares and analyzes similarities between similarities between track features of an arm(s) of a current image frame and track features of the arm(s) of the previous image frame. An arm having the highest similarity is high in accuracy of track.

Information of tracked arm(s) is used for tracking in a next image frame, and thus, a position and feature information of the tracked arm(s) is stored in the arm/hand information storage unit 600, and is used to track an arm(s) in the next image frame.

In operation S40, the hand detecting unit 400 calculates a position of a hand and a position of a wrist in each tracked arm region, and detects a hand region by using the position of the hand and the position of the wrist.

In order to detect a plurality of hands, the hand detecting unit 400 first detects a hand candidate region from the tracked arm region. The hand candidate region is detected by the classifier that has been learned by the machine learning method or the pattern recognition method by using features such as a texture, a color, a shape, a length, a volume, and a depth difference.

In order to find a more accurate region of a hand, the hand detecting unit 400 detects a wrist region. The wrist is detected while moving from a central position of position of a hand region to a 3D pixel connection path. Since there are too many paths, a polar coordinate system with the position of the hand as the origin is set, and the wrist region is detected while sequentially moving between the paths by using an angle-based log search. The log search rapidly reduces the number of all possible paths by removing similar paths. The position of the wrist is determined on a path in which there two lines parallel to a path connected to the central position of the hand. In detail, the position of the wrist is detected at a position in which an inflection point is on the path.

The hand detecting unit 400 determines a hand region by using the positions of the hand and wrist. A hand determination method performs learning in a method similar to a hand candidate region detector, namely, the machine learning method or the pattern recognition method, to effect determination. A determination learning algorithm may be variously used. Only the hand region is accurately segmented from hand regions, finally determined as a hand, by using various segmentation techniques.

In operation S50, the hand tracking unit 500 tracks a hand by using an association between a first hand track feature of each of one or more hand regions detected from a current 3D image frame and a second hand track feature of each of one or more hand regions detected from a previous 3D image frame.

A hand tracking process performed by the hand tracking unit 500 is the same as the tracking process which is performed by the arm tracking unit 300 in operation S30, and thus, the description of operation S30 is applied to the hand tracking process.

In operation S60, the arm tracking unit 300 and the hand tracking unit 500 update a database with the first arm hand track feature and the first hand track feature.

As described above, the present invention has a large difference with the existing 2D hand region detecting/tracking methods in terms of accuracy, and more accurately detects a finger end point and pieces of joint information. The existing hand detecting/tracking method detects a person or a face by using a person detecting method or a face detecting method, and detects an arm with reference to the detected region, but the method according to the present invention can find an arm even without a whole body or face of a person being seen. Also, the method according to the present invention does not need initialization for detecting/tracking an arm and a hand, and automation can be made in system.

According to the present invention, pieces of tracked arm/hand information may be used as a priori information for a finger and joint recognizing method, and may be used as base information of an interaction necessary for fields such as a wearable computer, an AR, a virtual reality, gesture recognition, a human-robot interface (HRI), a human-computer interface (HCI), and artificial intelligence.

A method for detecting a plurality of arms and hands by using a 3D image according to an embodiment of the present invention may be implemented in a computer system, e.g., as a computer readable medium. As shown in in FIG. 6, a computer system 120-1 may include one or more of a processor 121, a memory 123, a user input device 126, a user output device 127, and a storage 128, each of which communicates through a bus 122. The computer system 120-1 may also include a network interface 129 that is coupled to a network 130. The processor 121 may be a central processing unit (CPU) or a semiconductor device that executes processing instructions stored in the memory 123 and/or the storage 128. The memory 123 and the storage 128 may include various forms of volatile or non-volatile storage media. For example, the memory may include a read-only memory (ROM) 124 and a random access memory (RAM) 125.

Accordingly, a method for detecting a plurality of arms and hands by using a 3D image according to an embodiment of the present invention may be implemented as a computer implemented method or as a non-transitory computer readable medium with computer executable instructions stored thereon. In an embodiment, when executed by the processor, the computer readable instructions may perform a method according to at least one aspect of the invention.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for detecting a plurality of arms and hands by using a three-dimensional (3D) image, the apparatus comprising:
    an image input unit configured to acquire a 3D image of an object;
    an arm detecting unit configured to detect one or more component-unit candidate regions of the object in the 3D image, and detect one or more arm regions by using arm detection feature information, extracted from each of the candidate regions, and a pattern recognition algorithm; and
    a hand detecting unit configured to calculate a position of a hand and a position of a wrist in each of the arm regions detected by the arm detecting unit, and detect a hand region by using the position of the hand and the position of the wrist.

2. The apparatus of claim 1, wherein by using a cascade technique, the arm detecting unit sequentially excludes candidate regions, from which feature information having a low correlation with feature information of an arm are extracted, among the detected candidate regions.

3. The apparatus of claim 1, wherein the arm detecting unit comprises:
    an object detector configured to detect the one or more component-unit candidate regions of the object in the 3D image;
    an arm feature extractor configured to extract the arm detection feature information from each of the candidate regions; and
    an arm object determiner configured to, by using a cascade technique, sequentially exclude candidate regions, from which feature information having a low correlation with feature information of an arm are extracted, among the detected candidate regions to determine an arm candidate region.

4. The apparatus of claim 1, wherein the feature information comprises at least one of a texture, a color, a shape, a length, a contour line, and a parallel line.

5. The apparatus of claim 1, wherein the hand detecting unit determines the hand region by using a classifier that has been learned by using the position of the hand and the position of the wrist as feature information.

6. The apparatus of claim 1, wherein the hand detecting unit detects a hand candidate region from each arm region, sets a region having a predetermined volume of a hand in a 3D pixel connection path direction with respect to an uppermost pixel in a long axis direction of an arm in the hand candidate region, and determines, as the position of the hand, an average position coordinate value of pixels included in the set region.

7. The apparatus of claim 1, wherein the hand detecting unit sets a polar coordinate system with the position of the hand as an origin, performs an angle-based log search, and searches for a wrist region while sequentially moving between paths.

8. The apparatus of claim 1, wherein the hand detecting unit determines, as the position of the wrist, a point for which an inflection point is generated on a moving path, in which there is a parallel line with respect to the moving path, among a plurality of paths with the position of the hand as an origin in a 3D pixel direction.

9. An apparatus for detecting a plurality of arms and hands by using a three-dimensional (3D) image, the apparatus comprising:
    an image input unit configured to acquire a real-time 3D image of an object;
    an arm detecting unit configured to detect one or more component-unit candidate regions of the object in a current 3D image frame, and detect one or more arm regions by using arm detection feature information, extracted from each of the candidate regions, and a pattern recognition algorithm;
    an arm tracking unit configured to track an arm by using an association between a first arm track feature of each of one or more arm regions detected from the current 3D image frame and a second arm track feature of each of one or more arm regions detected from a previous 3D image frame;
    a hand detecting unit configured to calculate a position of a hand and a position of a wrist in each arm region tracked by the arm tracking unit, and detect a hand region by using the position of the hand and the position of the wrist; and
    a hand tracking unit configured to track a hand by using an association between a first hand track feature of each of one or more hand regions detected from the current 3D image frame and a second hand track feature of each of one or more hand regions detected from the previous 3D image frame.

10. The apparatus of claim 9, wherein by using a cascade technique, the arm detecting unit sequentially excludes candidate regions, from which feature information having a low correlation with feature information of an arm are extracted, among the detected candidate regions.

11. The apparatus of claim 9, wherein the arm tracking unit evaluates a similarity between the first arm track feature of each of the one or more arm regions detected from the current 3D image frame and the second arm track feature of each of the one or more arm regions detected from the previous 3D image frame to track an arm.

12. The apparatus of claim 9, wherein the hand detecting unit determines the hand region by using a classifier that has been learned by using the position of the hand and the position of the wrist as feature information.

13. The apparatus of claim 9, wherein the hand detecting unit detects a hand candidate region from each arm region, sets a region having a predetermined volume of a hand in a 3D pixel connection path direction with respect to an uppermost pixel in a long axis direction of an arm in the hand candidate region, and determines, as the position of the hand, an average position coordinate value of pixels included in the set region.

14. The apparatus of claim 9, wherein the hand detecting unit sets a polar coordinate system with the position of the hand as an origin, performs an angle-based log search, and searches for a wrist region while sequentially moving between paths.

15. The apparatus of claim 9, further comprising a hand/arm information storage unit configured to store the first and second arm track features and the first and second hand track features.

16. A method of detecting a plurality of arms and hands by using a three-dimensional (3D) image, the method comprising:

acquiring a real-time 3D image of an object;

detecting one or more component-unit candidate regions of the object in a current 3D image frame, and detecting one or more arm regions by using arm detection feature information, extracted from each of the candidate regions, and a pattern recognition algorithm;

tracking an arm by using an association between a first arm track feature of each of one or more arm regions detected from the current 3D image frame and a second arm track feature of each of one or more arm regions detected from a previous 3D image frame;

calculating a position of a hand and a position of a wrist in each tracked arm region, and detecting a hand region by using the position of the hand and the position of the wrist;

tracking a hand by using an association between a first hand track feature of each of one or more hand regions detected from the current 3D image frame and a second hand track feature of each of one or more hand regions detected from the previous 3D image frame; and updating a database with the first arm hand track feature and the first hand track feature.

* * * * *